(12) United States Patent
Nivelles (10) Patent No.: US 12,072,045 B2
(45) Date of Patent: Aug. 27, 2024

(54) CONNECTING MEANS FOR CONNECTING A PIPE TO A PIPE SECTION AT AN OPENING, SUCH AS, FOR EXAMPLE, A PIPE SECTION AT A DISCHARGE OPENING, AND A METHOD FOR CONNECTING A PIPE USING SUCH CONNECTING MEANS

(71) Applicant: **GENI*US Besloten Vennootschap Met Beperkte Aansprakelijkheid,** Sint-Truiden (BE)

(72) Inventor: Geert Rita Erik Victor Nivelles, Sint-Truiden (BE)

(73) Assignee: **GENI*US Besloten Vennootschap Met Beperkte Aansprakelijkheid,** Sint-Truiden (BE)

( * ) Notice: Subject to any disclaimer, the term of this patent is extended or adjusted under 35 U.S.C. 154(b) by 116 days.

(21) Appl. No.: 17/760,720

(22) PCT Filed: Sep. 9, 2020

(86) PCT No.: PCT/IB2020/058375
§ 371 (c)(1),
(2) Date: Mar. 15, 2022

(87) PCT Pub. No.: WO2021/053466
PCT Pub. Date: Mar. 25, 2021

(65) Prior Publication Data
US 2022/0299136 A1  Sep. 22, 2022

(30) Foreign Application Priority Data

Sep. 18, 2019 (BE) .................................. 2019/5614

(51) Int. Cl.
*F16L 21/03* (2006.01)
(52) U.S. Cl.
CPC .................................. *F16L 21/03* (2013.01)

(58) Field of Classification Search
CPC . F16L 17/00; F16L 17/02; F16L 19/06; F16L 19/061; F16L 19/065;
(Continued)

(56) References Cited

U.S. PATENT DOCUMENTS 5,044,822 A * 9/1991 Moss ..................... F16L 55/163
405/133
2011/0084475 A1* 4/2011 Abbasi ..................... E04D 13/08
285/15

(Continued)

FOREIGN PATENT DOCUMENTS

| DE | 20112459 U1 | 10/2001 |
| FR | 1208967 A | 2/1960 |
| WO | 2018/145139 A1 | 8/2018 |

OTHER PUBLICATIONS

International Search Report and Written Opinion from Application No. PCT/IB2020/058375 dated Dec. 15, 2020.

*Primary Examiner* — Aaron M Dunwoody
(74) *Attorney, Agent, or Firm* — Troutman Pepper Hamilton Sanders LLP; Ryan A. Schneider; Korbin M. Blunck (57) ABSTRACT

A connecting system including a coupling piece configured to be fitted over a first end of a pipe section, tightening means configured to tighten and seal the coupling piece against a second end of the pipe section at an opening, and an auxiliary tool configured to act on the tightening means for tightening or loosening the tightening means. The auxiliary tool protrudes through the opening during an act on the tightening means so it is configured to be operated by an installer from a side of the opening opposite a side with the pipe section.

16 Claims, 9 Drawing Sheets

(58) Field of Classification Search
CPC ... F16L 19/0653; F16L 19/0656; F16L 19/07; F16L 21/03; F16L 21/04; F16L 21/045; F16L 33/20; F16L 33/207; F16L 33/2071; F16L 33/2073; F16L 33/2078; F16L 33/222; F16L 33/223; F16L 33/224; F16L 33/30; F16L 47/06; F16L 47/08; F16L 47/12; F16L 47/10; F16L 55/163; F16L 55/1645

See application file for complete search history.

(56) References Cited

U.S. PATENT DOCUMENTS

2018/0038520 A1* 2/2018 Pionetti .................. F16L 1/19
2018/0066783 A1 3/2018 Bunn et al.
2018/0372257 A1* 12/2018 Bassett ................ F16L 41/14

* cited by examiner

CONNECTING MEANS FOR CONNECTING A PIPE TO A PIPE SECTION AT AN OPENING, SUCH AS, FOR EXAMPLE, A PIPE SECTION AT A DISCHARGE OPENING, AND A METHOD FOR CONNECTING A PIPE USING SUCH CONNECTING MEANS

CROSS-REFERENCE TO RELATED APPLICATIONS

This application is a US National Stage of International Application No. PCT/IB2020/058375 filed 9 Sep. 2020, which claims the benefit of BE Application No. 2019/5614 filed 18 Sep. 2019, the entire contents and substance of which are incorporated herein by reference in their entirety as if fully set forth below.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

Connecting means for connecting a pipe to a pipe section at an opening, such as, for example, a pipe section at a discharge opening, and a method for connecting a pipe using such connecting means.

BRIEF SUMMARY OF THE INVENTION

First of all, the present invention concerns connecting means for connecting a pipe to a pipe section at an opening, such as, for example, to a pipe section at a discharge opening.

The opening is typically a discharge opening of a sanitary installation, but it may just as well be a supply opening or it may be an opening of another installation, such as an opening of a ventilation system or the like, and in principle it may be any opening onto which a pipe section is provided.

More specifically, the invention relates to connecting means for connecting a pipe to the first end of a pipe section, the second end of the pipe section being fitted with an external collar to form an opening, for example, a discharge opening of a sanitary installation.

In an interesting application, the aforementioned collar on the pipe section may be almost rectangular or elongated and may be arranged in a sliding manner and in a surrounding frame in order to be able to vary the position of the (discharge) opening, but the invention is by no means limited to such an application.

Connecting means for connecting a pipe, such as for example a discharge pipe to an opening, for example a discharge opening, are already known, but in many cases their installation is not easy.

Typical cases in which difficulties often arise are drain pipes that need to be connected to drain openings of showers or baths or in a floor.

The reason is that it is very difficult for an installer to get to the positions where the drain pipe has to be connected to the drain opening.

In some cases, openings must be made in underlying ceilings and the like to this end.

Another disadvantage of the known connecting means is that they are not easy to adjust in height.

Once the parts have been sawn or cut to size, everything has to fit perfectly, which can lead to problems in practice.

In other cases, gluing is used, which can lead to similar problems with regard to the correct adjustment of the parts during installation and, additionally, in such cases there is often the problem that the parts cannot be disassembled afterwards.

When connecting elements by means of gluing, there is also only a limited time available for the correct assembly and positioning of the elements to be connected, which in many situations can greatly complicate the installation or easily lead to errors.

Another disadvantage of using an adhesive technique is that not all materials can be glued together.

This is particularly often the case when two elements made of different materials have to be glued together.

For example, it is impossible to connect elements made of ABS (Acrylonitrile-Butadiene-Styrene) with stainless steel by applying an adhesive technique.

The present invention therefore aims to provide a solution to one or more of the aforementioned and/or other disadvantages.

More specifically, the aim of the invention is to provide connecting means for connecting a pipe, such as a drain pipe, to a pipe section at an opening, for example a discharge opening, which can be used in a very simple manner to obtain a well-sealed connection.

More specifically, the invention aims to ensure that an installer, when making a connection with such connecting means, can perform the most important operations from the accessible side of the relevant opening with a pipe section, so that the need to provide large access openings on the underside or opposite side of the opening can be avoided.

Another aim of the invention is to ensure that, at least in certain embodiments of the connecting means, after connecting a pipe, such as for example a drain pipe, to a pipe section at an opening such as for example a drain opening, they can be easily or relatively easily loosened again.

Yet another aim of the invention is to provide connecting means that can still be adjusted to some extent while being connected.

An additional aim of the invention is to ensure that an installer can freely take the time to reposition or adjust the elements to be connected, so that the speed at which the installation has to be carried out no longer plays a role, as is the case when gluing.

To this end, the invention concerns connecting means for connecting a pipe, such as for example a drain pipe, to the first end of a pipe section, the second end of the pipe section being provided with an external collar to form an opening, such as for example a discharge opening, and wherein the connecting means contain at least the following elements:

a coupling piece which can be fitted over the first end of the pipe section;

tightening means for tightening and sealing the coupling piece against the pipe section at the opening; and, an auxiliary tool which can act on the tightening means for tightening or loosening the tightening means by manipulating or activating and/or deactivating the tightening means and wherein the auxiliary tool protrudes through the opening during the manipulation, activation and/or deactivation process and can thus be operated by an installer from the side of the opening opposite the side with the pipe section.

A first major advantage of such connecting means according to the invention is that they are equipped with tightening means which allow a coupling piece to be tightened against the pipe section at the opening and to be sealed by using an auxiliary tool which can be operated by an installer from the side of the opening opposite the side with the pipe section.

This avoids the need for manipulations on the side with a pipe section and access openings having to be provided to be able to reach this side.

In a possible embodiment of connection means according to the invention, the coupling piece is part of a screw coupling and the coupling piece is provided with an internal thread to this end, and the tightening means also include a sealing ring as well as a tubular internal screw piece which is provided with an external thread that can interact with the internal thread of the coupling piece.

Such an embodiment of connecting means according to the invention is very interesting, as the connection of the coupling piece requires a screwing operation, wherein the position of this coupling piece can still be adjusted slightly before screwing it on.

Furthermore, such connecting means according to the invention in the form of a screw coupling have the advantage that they can be unscrewed fairly easily at a later stage as well, for example with the intention of inspecting the inside of the drain pipe for dirt and the like.

In another possible embodiment of connecting means according to the invention, the coupling piece is part of a clamp coupling, and the coupling piece is provided to that end with a folded edge which is directed radially inwards to form a slot with a U-shaped cross-section, and the tightening means further include a hose-spring clamp in the form of an annular spring element whose internal diameter decreases as the spring element relaxes, wherein the hose-spring clamp can be fitted in the U-shaped slot in its tensioned state.

A major advantage of such an embodiment of connecting means according to the invention is that by using an adapted auxiliary tool with a hook-shaped end, the hose-spring clamp can be easily manipulated from the side of the opening opposite the side with the pipe section in such a way that the hose-spring clamp can be brought from a tightened state to a partially relaxed state, wherein in this partially relaxed state the hose-spring clamp tightens the edge of the coupling piece against the pipe section at the opening.

It is clear that such a way of connecting the connection means is very efficient and also allows an adjustment of the position of the coupling piece before tightening the coupling piece to the pipe section at the opening.

In another preferred embodiment of connecting means according to the invention, the coupling piece is formed by the end of the pipe or the drain pipe itself to be connected.

Such an embodiment is extremely practical because no additional means are required to connect the pipe or drain pipe to the coupling piece.

In an alternative embodiment of connecting means according to the invention, the connecting means include additional connection devices for connecting the drain pipe to the coupling piece.

Also this embodiment of connecting means according to the invention can be advantageous, since the mutual position between the coupling piece and the drain pipe can still be adjusted before the pipe or drain pipe is connected to the coupling piece using the connection devices.

The invention also relates to a method of connecting a pipe, such as for example a drain pipe, to the first end of a pipe section, the second end of the pipe section being provided with an external collar to form an opening, for example a discharge opening, with connecting means in accordance with the invention as described above.

It is characteristic of such a method according to the invention that it includes at least the following steps:

applying the coupling piece of the connecting means over the first end of the pipe section of the discharge opening;

applying the tightening means in the coupling piece;

tightening the tightening means by manipulating and/or activating the tightening means with the auxiliary tool along the side of the opening opposite the pipe section; and, removing the auxiliary tool.

It is clear that a major advantage of such a method is that the tightening means can be manipulated and/or activated by an installer along the side of the opening opposite the side with the pipe section.

In a preferred method according to the invention, the application of the tightening means consists in first applying a sealing ring over the pipe section of the opening inside the coupling piece and then an internal screw piece, and the sealing ring is tightened using an auxiliary tool in the form of a spanner with which the internal screw piece can be tightened.

Such a method according to the invention is very advantageous, as the tightening means on the easily accessible side of the opening can be easily tightened and loosened again with the spanner.

In another preferred method according to the invention, applying the tightening means consists in applying a holder in the coupling piece in which a hose-spring clamp is being held tight by means of an auxiliary tool with a hook-shaped end, wherein the hose-spring clamp is inserted into a folded edge with a U-shaped cross-section of the coupling piece and the tightening consists in removing the auxiliary tool by a downward movement, wherein the internal diameter of the hose-spring clamp decreases and a clamping of the folded edge of the coupling piece against the pipe section is obtained.

This method is also very efficient for connecting a pipe or drain pipe to a pipe section at an opening, such as for instance a discharge opening, wherein a secure seal is obtained in an extremely fast manner.

BRIEF DESCRIPTION OF THE SEVERAL VIEWS OF THE DRAWINGS

In order to better explain the characteristics of the invention, a few preferred embodiments of connecting means according to the invention are described below by way of example without being restrictive in any way, as well as a method according to the invention for connecting with such connecting means, with reference to the accompanying figures, in which.

DETAILED DESCRIPTION OF THE INVENTION

Figure 1:
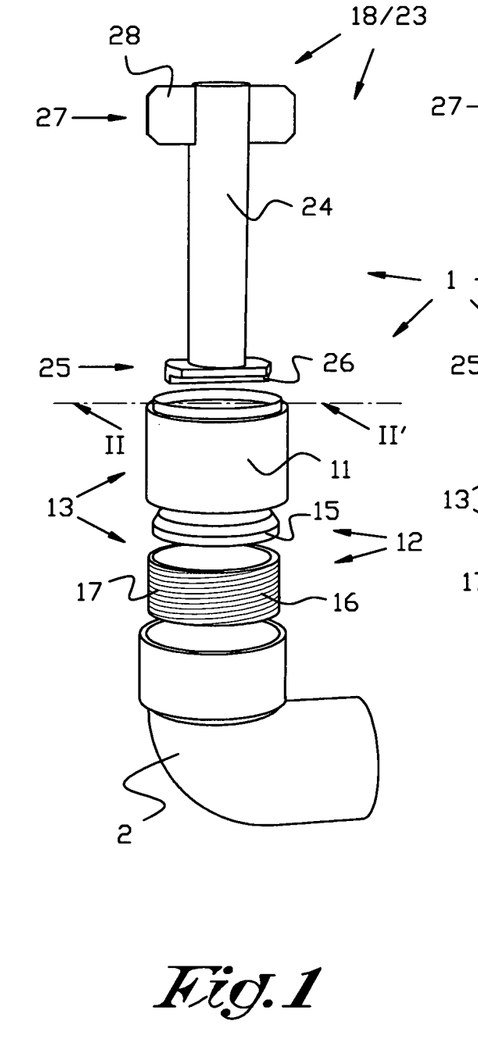
FIG. 1 shows a view in perspective of a first embodiment of connecting means according to the invention and of a pipe in the form of a drain pipe as disassembled and without any representation of a pipe section at an opening or discharge opening.
Figure 2:
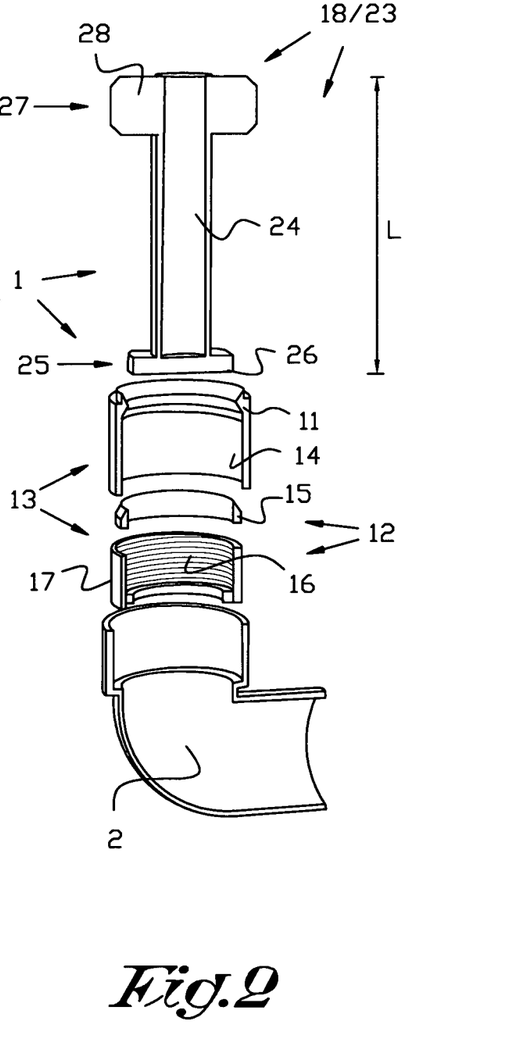
FIG. 2 is a perspective view of a cross-section according to line II-II' through the connecting means and the drain pipe in FIG. 1, still as disassembled.
Figure 3:
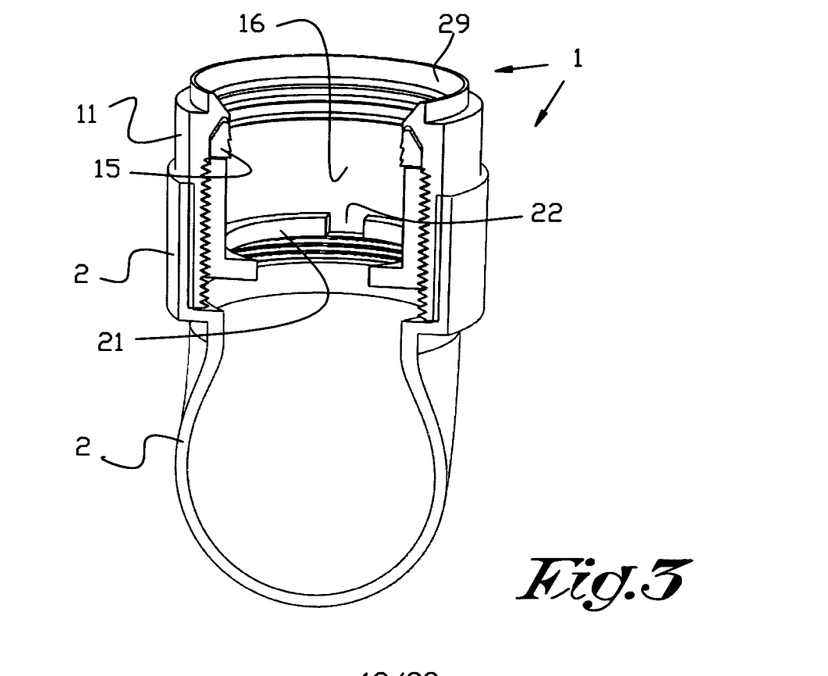
FIG. 3 shows a cross-section as in FIG. 2 to a larger scale, but this time in the assembled state.
Figure 7:
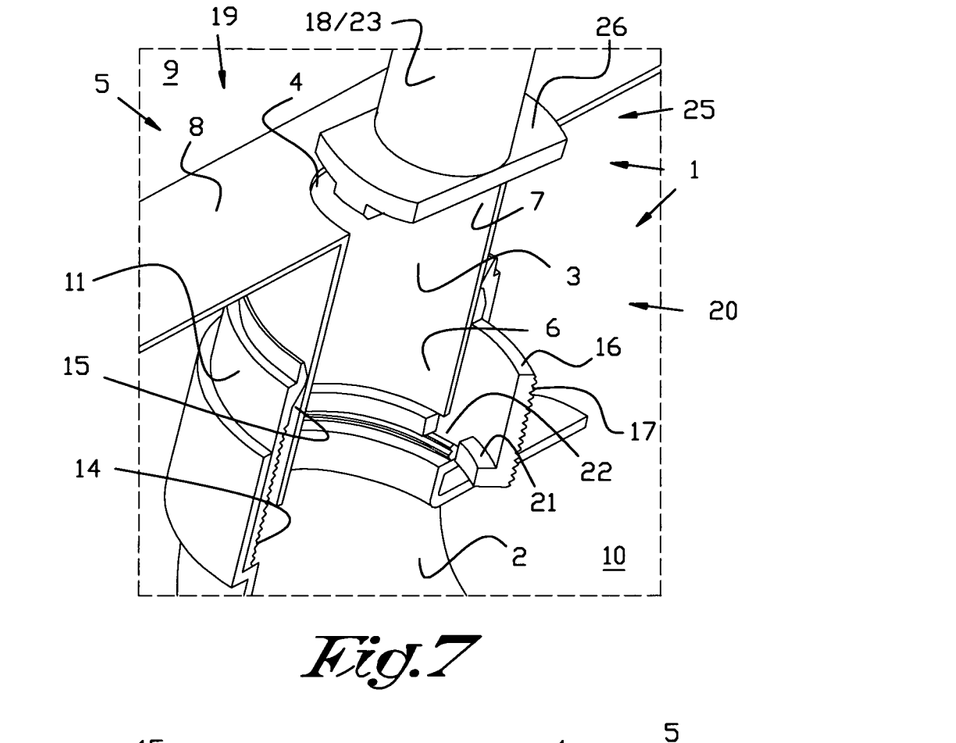
FIGS. 7 and 8 show two views in perspective of the connecting means according to the invention in FIG. 1, during the connection of a drain pipe to a pipe section at a discharge opening.
Figure 8:
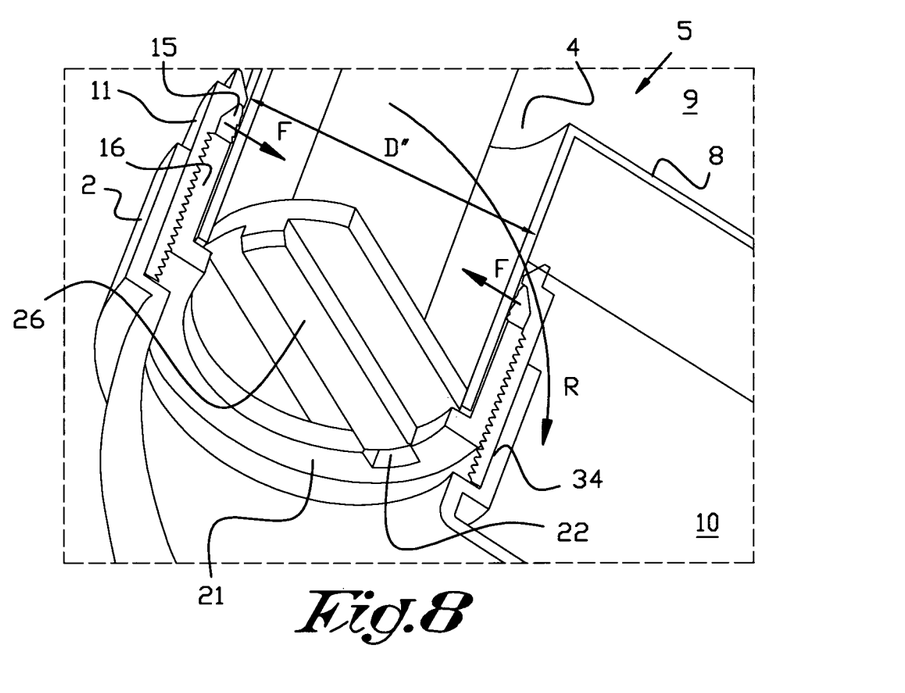

The connecting means 1 according to the invention shown in FIGS. 1 and 2 are intended for connecting a pipe 2, for example in the form of a straight drain pipe 2, an elbow 2, a siphon or any other type of pipe or drain pipe, to a pipe section 3 at an opening 4, typically a discharge opening 4 of a sanitary installation 5, an example of which is shown in FIGS. 7 and 8.

More specifically, in this case, the drain pipe 2 is intended to be connected to a first end 6 of the pipe section 3, the second end 7 of the pipe section 3 being fitted with an external collar 8 to form the discharge opening 4 of the sanitary installation 5.

The connecting means 1 are typically intended for situations wherein the discharge opening 4 is provided, for example, in a floor area 9 or in a low-lying area, such as for example a drain opening in a shower, in a bath or a drain opening in a floor area of a walk-in shower or similar, and wherein the discharge opening 4 is formed by the second end 7 of the pipe section 3 with collar 8.

It is clear that in such situations, connecting a drain pipe 2 to the first, free end 6 of the pipe section 3 can be very problematic, as this first end 6 is generally not easily accessible, unless access openings and space are created at the bottom 10 which are large enough for an installer to do his work there.

On the other hand, the use of a discharge opening 4 formed by the second end 7 of the pipe section 3 with collar 8 is very interesting.

After all, by properly choosing the shape of the collar 8 and providing additional means in which this collar 8 can be shifted back and forth in a sealed manner, it is still possible to position the discharge opening 4 during the installation.

This often has major advantages, for example typically in buildings where the floors are formed by wooden beams and consequently a drain pipe 2 cannot pass through the floor at any point whatsoever.

Of course there are many other possible situations in which an underlying structure can form an impenetrable obstacle to the installation of a drain pipe 2.

In such a case, the best or often the only possible solution is to shift the discharge opening 4 into a position where there is no such impenetrable obstacle.

In short, with the connecting means 1 according to the invention, such a difficult situation can also be solved in a simple manner.

To this end, the connecting means 1 first of all comprise a coupling piece 11 which can be fitted over the first end 6 of the pipe section 3.

A certain clearance is deliberately left in this case between the first end 6 of the pipe section 3 and the coupling piece 11, and one end of the coupling piece 11 is provided with a conical entrance so that the assembly of the pipe section 3 and the coupling piece 11 is smooth, even in the event of an imperfect mutual positioning of the involved elements during installation.

For example, the coupling piece 11 can be made of EPDM.

The connecting means 1 are further provided with tightening means 12 for tightening and sealing the coupling piece 11 to the pipe section 3 at the discharge opening 4.

In the embodiment of connecting means 1 according to the invention, as shown in FIGS. 1 to 8, the coupling piece 11 is part of a screw coupling 13.

To this end, the coupling piece 11 is provided with an internal screw thread 14 and the tightening means 12 include a sealing ring 15, as well as a tubular internal screw piece 16.

The screw piece 16 has an external screw thread 17 which can work together with the internal screw thread 14 of the coupling piece 11.

The connecting means 1 further include an auxiliary tool 18 which can engage the tightening means 12 or can work in conjunction with the tightening means 12 for tightening or releasing the tightening means 12 by manipulating or activating and/or deactivating the tightening means 12.

It is essential to note that, during the manipulation, activation and/or deactivation process, the auxiliary tool 18 protrudes through the discharge opening 4 and can thus be operated by an installer from the side 19 of the discharge opening 4 opposite the side 20 with pipe section 3.

In the embodiment shown in FIGS. 1 to 8, the auxiliary tool 18 is designed for screwing in or screwing out the screw piece 16 in the coupling piece 11, depending on whether the tightening means 12 are to be tightened or relaxed.

The internal screw piece 16 is herein provided with a collar 21 which extends radially inwards and which is centrally provided with a slot 22.

In order to be able to cooperate with this screw piece 16, the auxiliary tool 18 is in this case designed as an elongated spanner 23 with an elongated body 24 which is cylindrical in this embodiment, one end 25 of which has a projection 26 extending transversely to the elongated body in a radial direction and which can be fitted into the aforementioned slot 22 for screwing the internal screw piece 16 into the coupling piece 11.

The other end 27 of the auxiliary tool 18 is provided with a pair of wings extending transversely to the elongated body 24 of the auxiliary tool 18 serving as a handle 28, which will facilitate the manual tightening or unscrewing of the screw piece 16.

The length L of the spanner 23 is sufficient for the spanner 23 to extend from the tightening means 12 to above the discharge opening 4 over a sufficient length for an installer to be able to easily work with it.

The aim is that, during the connection, the seal 15 between the coupling piece 11, the internal screw piece 16 and the pipe section 3 of the discharge opening 4 is tightened by turning the spanner, indicated by arrow R in FIG. 8, so that the screw coupling 13, formed by the screw piece 16, the coupling piece 11 and the seal 15, is clamped to the pipe section 3.

The different elements are herein geared to each other in such a way that the seal 15 pushes with a force F against the pipe section 3, whereby a clamping is obtained that is preferably sufficiently great to be able to bear a certain vertical load.

For example, in the clamped state, it must be possible to permanently suspend a minimum vertical load of 20 kg, directed downwards, on the coupling piece 11 without the coupling piece 11 being displaced over the pipe section 3.

In the embodiment shown in FIGS. 1 to 8, the coupling piece 11 is provided with an edge 29 which is recessed slightly radially inward to form an inner circular opening having a diameter D corresponding to the outside diameter D' of the pipe section 3 at the discharge opening 4.

This edge 29 is provided with a radially inwardly directed indentation 30 against which the seal 15 can rest while the tightening means 12 are being tightened.

The inner diameter of the coupling piece 11 increases linearly from the indentation 30 according to a bevel 31 up to an inner diameter D" corresponding to the inner diameter D" of the internal screw thread 14 in the coupling piece 11.

The side of the seal 15, which must be directed towards the edge 29 and indentation 30 of the coupling piece 11 during assembly, has an external bevel 32 which is complementary to the bevel 31 in the coupling piece 11.

The part of the seal 15 that connects to the bevel 31 has a more or less constant thickness T corresponding to the thickness T' of the screw piece 16.

On the radial inside, however, the seal 15 is provided with ridges 33 to improve the seal's grip on the pipe section 3.

Figure 6:
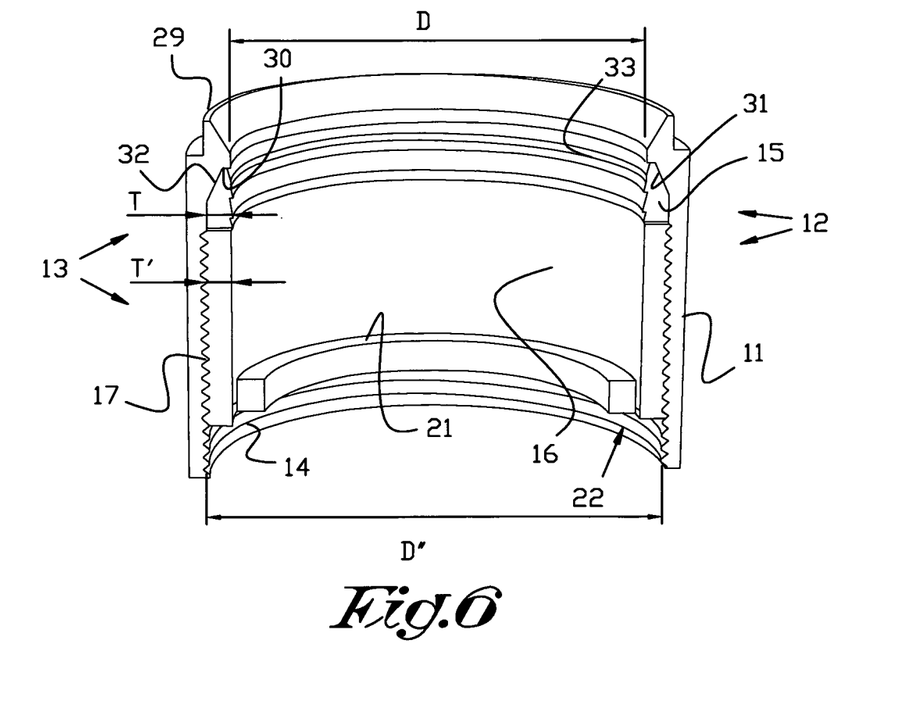
FIG. 6 shows the section shown in FIG. 5 marked with F6 in perspective and to a larger scale.

All this is shown in more detail in FIG. 6.

In the embodiment of FIGS. 1 to 8 discussed here, the connecting means 1 are equipped with additional connection devices 34 for connecting the drain pipe 2 to the coupling piece 11.

In this case, these additional connection devices 34 consist of a glue or adhesive and this glue is applied between the outside of the coupling piece 11 and the inside of a connection sleeve at the end of the drain pipe 2.

In some countries it is prohibited to glue the joints and, as an alternative, for example additional connection devices 34 can be used in the form of a screw clamp or the like.

In another embodiment, however, according to the invention, it is not excluded to provide the coupling piece 11 along an integral part of the drain pipe 2 formed by the end of the drain pipe 2 itself to be connected.

A method according to the invention for connecting a pipe, such as for example a drain pipe 2, to the first end 6 of a pipe section 3, wherein the second end 7 of the pipe section 3 is fitted with an external collar 8 to form an opening 4, for example a discharge opening 4 of a sanitary installation 5, with connecting means 1 according to the invention is simple and as follows.

A first step consists in fitting the coupling piece 11 of the connecting means 1 over the first end 6 of the pipe section 3 at the discharge opening 4.

In a next step, the tightening means 12 can be inserted into the coupling piece 11.

Subsequently, the aim is to tighten the tightening means 12 by manipulating and/or activating the tightening means 12 with the auxiliary tool 18 along the side of the discharge opening 4 opposite the pipe section 3.

The auxiliary tool 18 can then be removed.

In the case of FIGS. 1 to 8, providing the tightening means 12 consists of first providing a sealing ring 15 in the coupling piece 11 over the pipe section 3 of the discharge opening 4, followed by an internal screw piece 16.

The sealing ring 15 is then tightened using the auxiliary tool 18 in the form of a spanner 23 which fits with the protrusion 26 into the slot 22 and which can be used to tighten the internal screw piece 16.

After the tightening means 12 have been tightened, the drain pipe can be fitted over the coupling piece 11 and connected to the latter, for instance by applying adhesive 34.

It is not excluded according to the invention to change the sequence of steps described here.

FIGS. 9 to 18 show another embodiment of connecting means 1 according to the invention.

In this embodiment, the coupling piece 11 is part of a clamp coupling 35.

To this end, the coupling piece 11 is provided with a folded edge 36 which is directed radially inwards to form a slot 37 with a U-shaped cross-section.

In this embodiment, the tightening means 12 include a hose-spring clamp 38 in the form of a spring element 39 with two free ends 40 and 41 and which is folded into an open, annular spring element 39, whose internal diameter E decreases when the spring element 39 relaxes.

The hose-spring clamp 38 can be provided in its tensioned state, i.e. with enlarged internal diameter E, in a fitting manner into the U-shaped slot 37.

Figures 14, 15, 16:
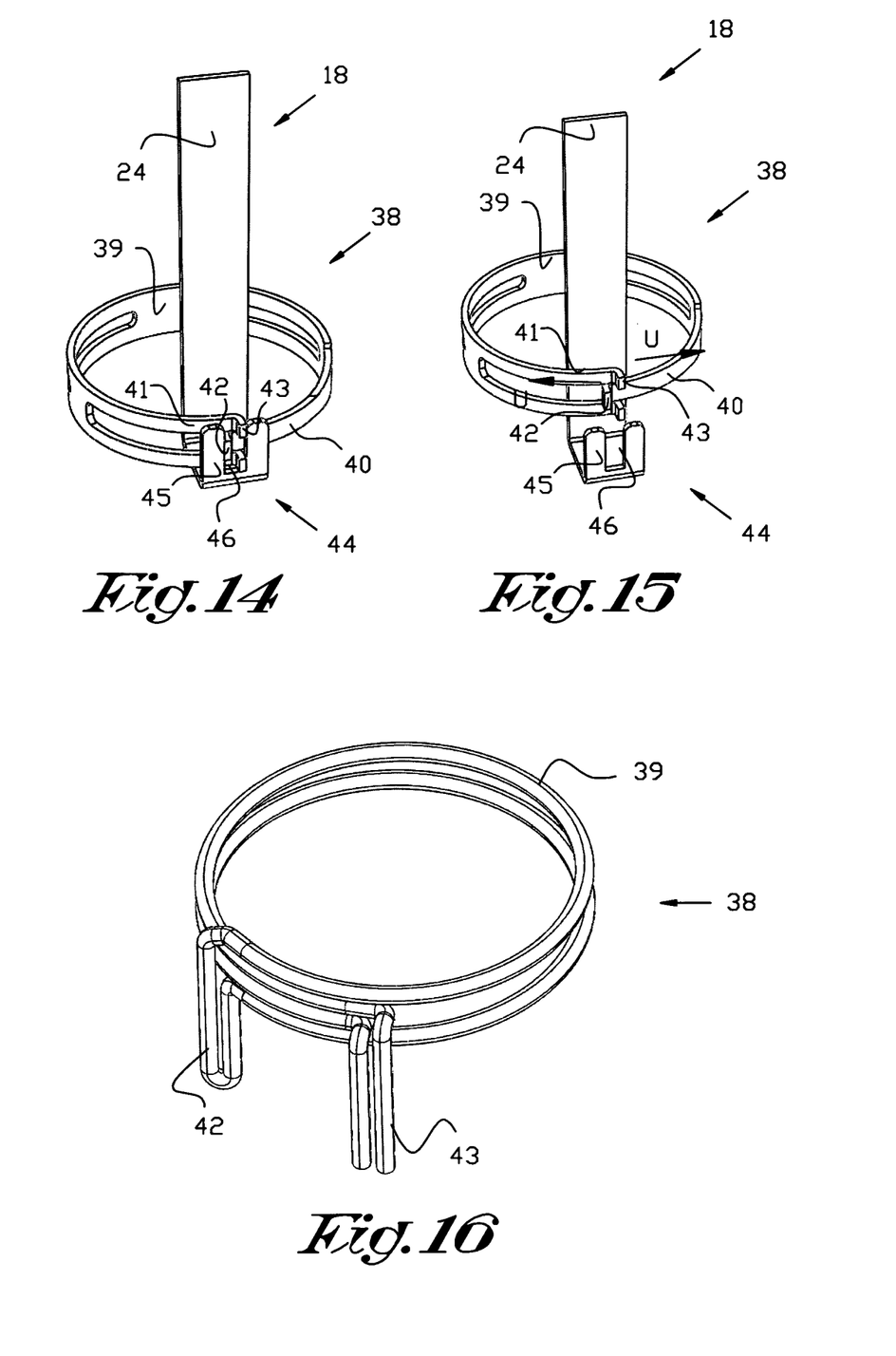
FIGS. 14 and 15 show, to a larger scale and in perspective, the same positions as in FIGS. 12 and 13, wherein this time only the auxiliary tool and the hose-spring clamp are shown.
FIG. 16 shows another embodiment of a hose-spring clamp in perspective.
Figure 17:
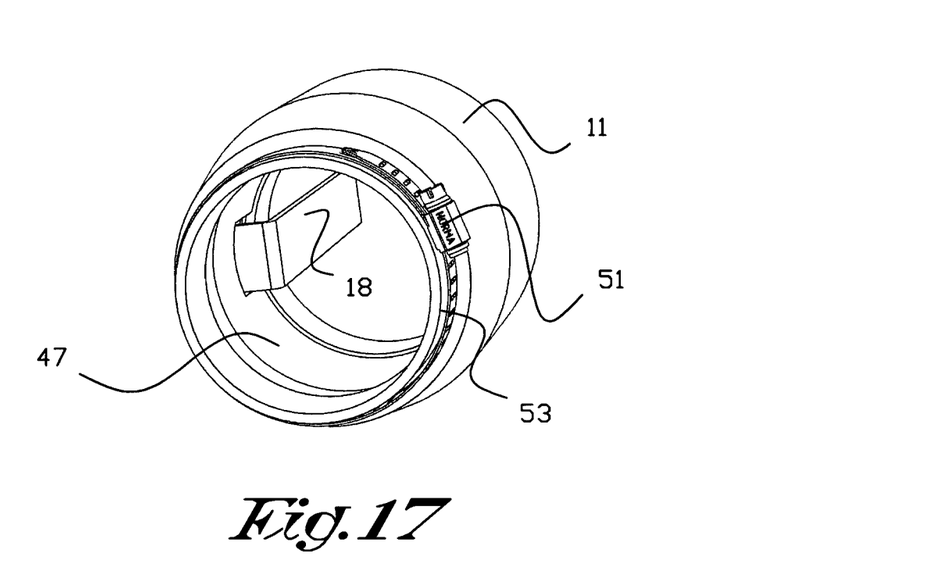
FIG. 17 shows a view according to arrow F17 of FIG. 10 in perspective.
Figure 18:
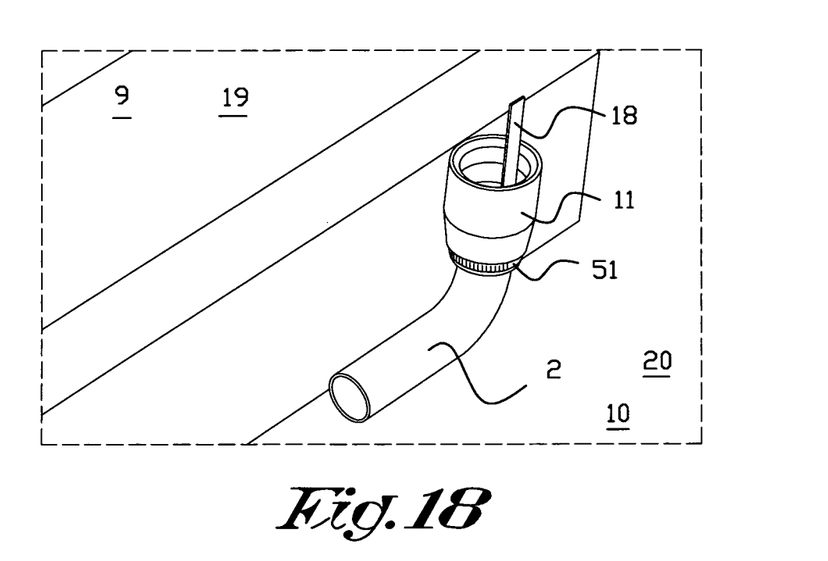
FIG. 18 shows an open floor in perspective, in which connecting means according to the invention as shown in FIG. 9 are connected to a drain pipe.

The hose-spring clamp 38 is shown in more detail in FIGS. 14 and 15, and in the relaxed state of the hose-spring clamp 38, its two free ends 40 and 41 will overlap slightly.

These free ends 40 and 41 are folded radially outwards to form outwardly directed protrusions 42 and 43.

These protrusions 42 and 43 ensure that the ends 40 and 41 can easily be grasped using pliers or the like to move them towards each other and thus tighten the hose-spring clamp 38, resulting in an increase in the internal diameter E.

In this embodiment of connecting means 1 according to the invention, there is also an auxiliary tool 18, which this time has a different design.

More specifically, the auxiliary tool 18 has an elongated body 24, which in this case is flat and has a hook-shaped end 44, with a section 45 extending parallel to the elongated body 24 and with a central slot 46 which also extends longitudinally parallel to the elongated body 24.

With this auxiliary tool 18, the hose-spring clamp 38 can be held in a tensioned state by retaining the radially outwardly directed protrusions 42 and 43 of the hose-spring clamp 38 in the slot 46 at the hook-shaped end 44 of the auxiliary tool 18.

This state is shown in FIG. 14.

By removing the auxiliary tool 18, the hose-spring clamp 38 relaxes, with the protrusions 42 and 43 moving apart according to the arrows U in FIG. 15, resulting in a reduction of the internal diameter E of the annular element 39.

In this case, the tightening means 12 are additionally equipped with a holder 47 which consists of a tubular piece which is provided at one end 48 with a protruding edge 49 in which the hose-spring clamp 38 can be held.

The edge 49 is interrupted and the holder 47 has an opening 50 at the point of interruption so that the protrusions 42 and 43 of the hose-spring clamp 38 can fall into this opening 50, and the hook-shaped end 44 can retain these protrusions 42 and 43.

The tubular holder 47 can be provided into the coupling piece 11 of the connecting means 1 in a fitting manner.

Figure 12:
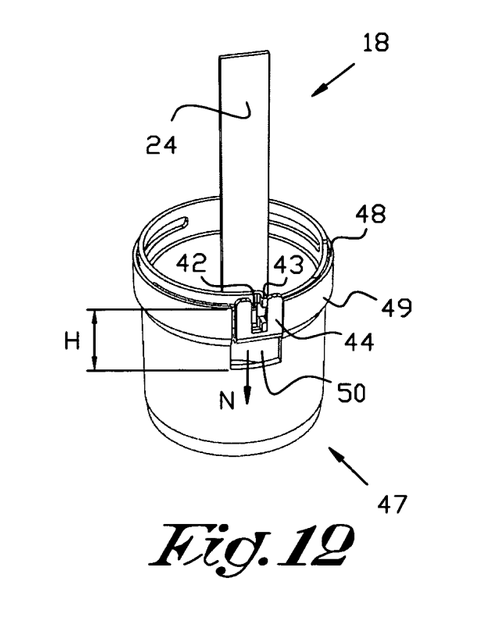
FIG. 12 shows some parts of the connecting means from FIG. 10 in perspective, in particular a holder in which a hose-spring clamp is being held tightened by means of an auxiliary tool.
Figure 13:
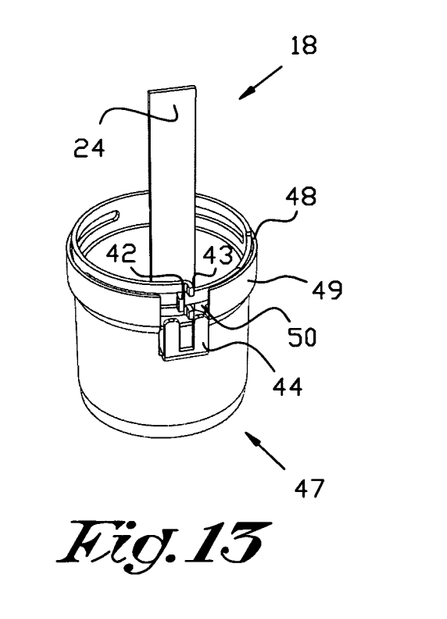
FIG. 13 shows the same parts as in FIG. 12 in perspective, when the auxiliary tool is removed from the hose-spring clamp by a downward movement.

The opening 50 has a height H that is large enough for the hook-shaped end 44 to move downwards, as shown by arrow N in FIG. 12, while the protrusions 42 and 43 are being released to thus relax, at least partially, the hose-spring clamp 38.

Indeed, the folded edge 36 of the coupling piece 11 is intended to be clamped against the pipe section 3 at the discharge opening 4 with a clamping force K so as to form a seal.

By moving the hook-shaped auxiliary tool 18 downwards during the connection of the connecting means 1, the tensioning of the hose-spring clamp 38 in the slot 36 of the coupling piece 11 can be activated.

In doing so, an installer can again simply operate the auxiliary tool from side 19 at the discharge opening 4 opposite the side 20 with the pipe section 3.

The second embodiment of connecting means 1 according to the invention discussed here again include additional connection devices 34 for connecting the drain pipe 2 to the coupling piece 11.

In this case, these additional connection devices 34 are not formed by an adhesive, but by a screw-on clamping ring or clamping device 51 which can be applied over the coupling piece 11 and which, by tightening it and by deforming the coupling piece 11, ensures a clamping with the pipe section 3.

To this end, the coupling piece 11 is equipped with an annular strip 53 on the edge 52 opposite the folded edge 36, on which the clamping device 51 can be fitted.

The method according to the invention involved in the use of the connecting means 1 as shown in FIGS. 8 to 19 is very similar to the method discussed earlier.

In this case, however, applying the tightening means 12 consists of inserting the holder 47 into the coupling piece 11, in which the hose-spring clamp 38 is being held in a tensioned state by means of the auxiliary tool 18 with hook-shaped end 44.

The hose-spring clamp 38 is further inserted into the folded edge 36 with U-shaped slot 37 of the coupling piece 11.

Tightening the tightening means 12 consists in removing the auxiliary tool 18 by performing a downward movement according to arrow N, wherein the internal diameter E of the hose-spring clamp 38 decreases and a clamping of the folded edge 36 of the coupling piece 11 against the pipe section 3 is obtained.

In a preferred embodiment of connecting means 1 in accordance with the invention, the parts are aligned in such a way that the auxiliary tool 18 is pushed away as a result of the insertion of the pipe section 3.

In this way, it is avoided that the hose-spring clamp 38 would be partially relaxed prematurely or, in other words, when the pipe section 3 has not yet been inserted with a required minimum length into the coupling piece 11, which would result in the tightening means 12 being tightened when the elements concerned are not sufficiently assembled yet.

In yet another preferred embodiment, an additional auxiliary tool is also provided, with which the hose-spring clamp 38 can also be released again, wherein this additional auxiliary tool can also be operated from the side of the opening 4.

After the tightening means 12 have been correctly tightened, the drain pipe 2 is fitted over the coupling piece 11 and the drain pipe is connected to the coupling piece 11 by screwing on the clamping device 51.

FIG. 16 shows an alternative embodiment for the hose-spring clamp 38, wherein in this case the protrusions 42 and 43 do not protrude radially outwards, but protrude downwards from the annular element 39.

It is clear that by using an adapted auxiliary tool 18, the same operation of the connecting means 1 can be obtained in a very simple manner, with the advantage that the radial dimensions of the hose-spring clamp 38 may be less in this case.

Figure 19:
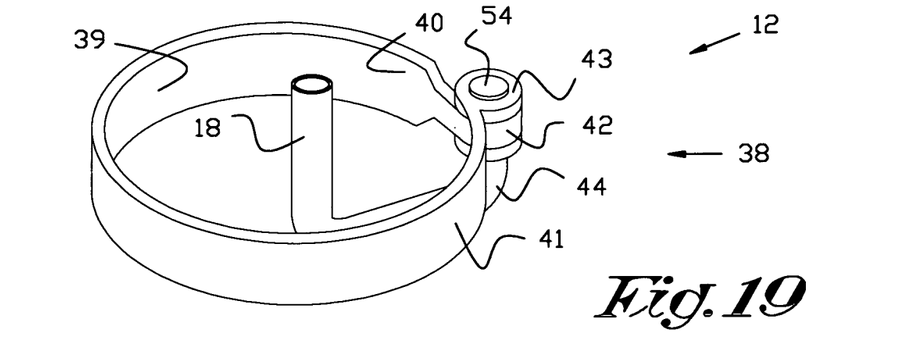
FIGS. 19 and 20 show yet another embodiment of a hose-spring clamp in perspective, respectively in a tightened and relaxed state; and, FIG. 21 illustrates in a cross-section how a pipe section can be connected to a drain pipe at a discharge opening with connecting means containing a hose-spring clamp, as shown in FIGS. 19 and 20.
Figure 20:
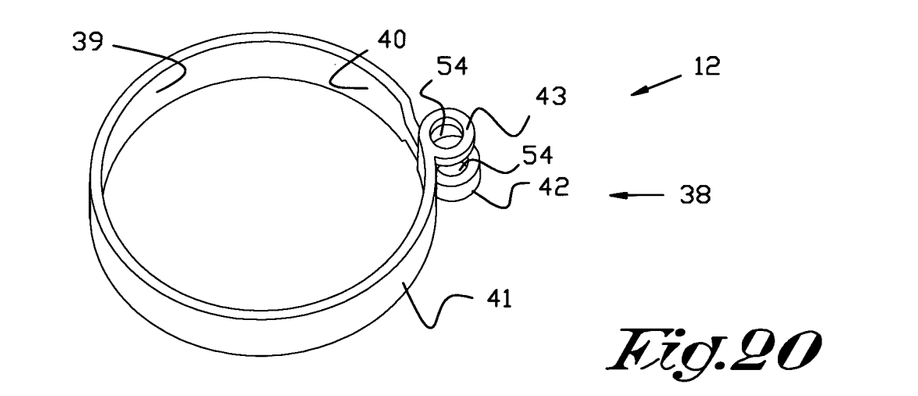
Figure 21:
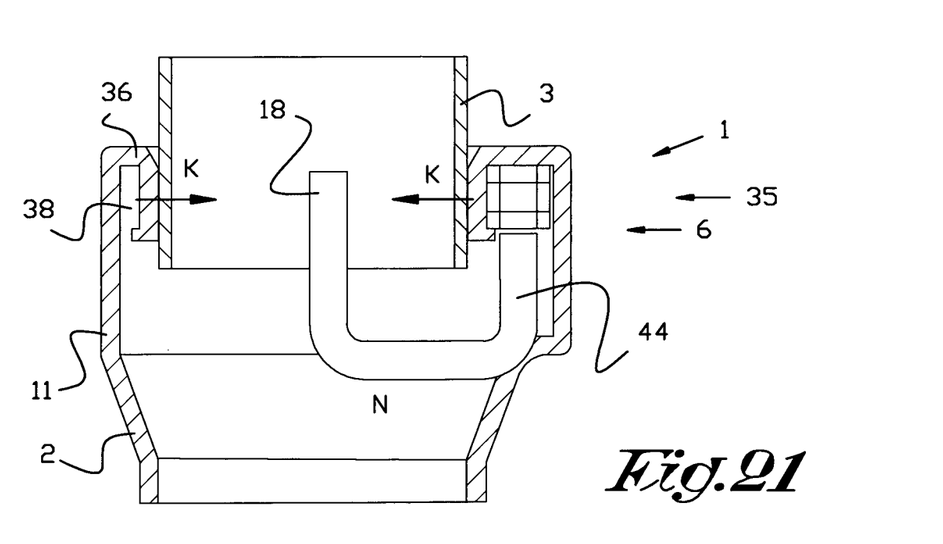

FIGS. 19 to 21 included show another similar embodiment of connecting means 1 according to the invention, wherein yet another type of hose-spring clamp 38 is used.

In this embodiment, the ends 40 and 41 of the annular spring element 39 are fitted with annular protrusions 42 and 43, each centrally provided with an opening 54.

These openings 54 can be superimposed by clamping the hose-spring clamp 38, and the hose-spring clamp 38 can be held in this tensioned state with an adapted auxiliary tool 18 which in this case has a hook-shaped round end 4 and can be inserted into the superimposed openings 54 in a fitting manner to this end.

This is shown in FIG. 19.

By removing the auxiliary tool 18, the state shown in FIG. 20 is obtained, wherein the internal diameter E of the annular element 39 has decreased.

Its application for connecting a drain pipe 2 to a pipe section 3 at a discharge opening 4 is schematically illustrated in FIG. 21.

This time, the coupling piece 11 is an integral part of the drain pipe 2 and no holder 47 for holding the hose-spring clamp 38 is used.

In principle, the connecting means 1 and methods described above can be used every time a large element is to be connected to a pipe section or pipe.

Figure 9:
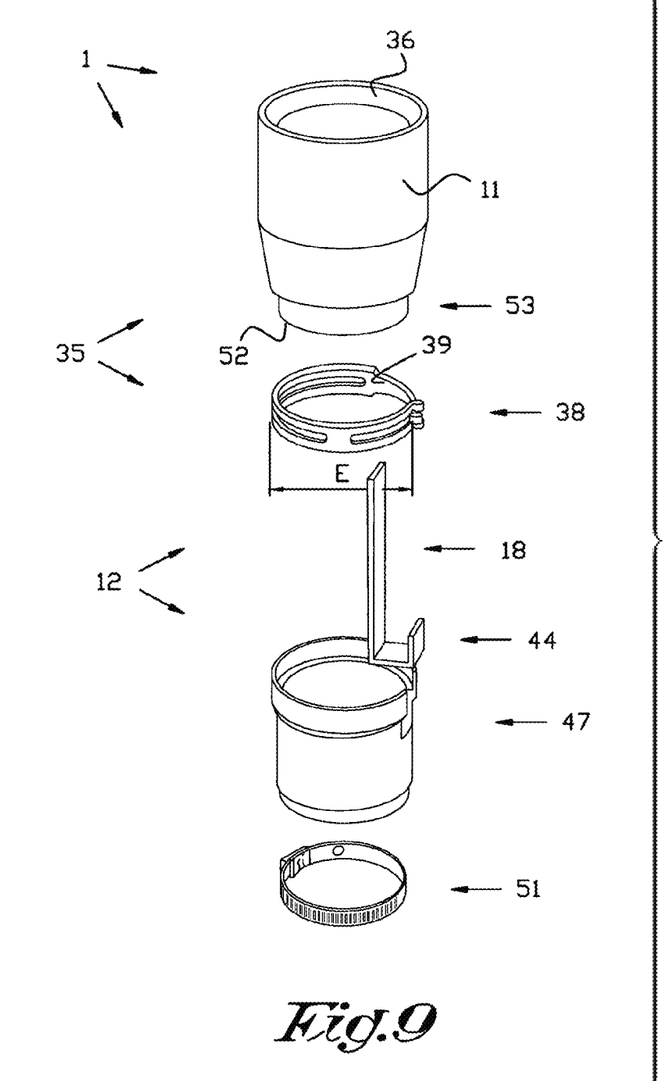
FIG. 9 shows an alternative embodiment of connecting means according to the invention in a similar manner to FIG. 1, in perspective and in a disassembled state.

In this description, the starting point is always a situation in which the various elements are unassembled, for example as in the state shown in FIGS. 1, 2 and 9.

In practice, the assembly of these elements can take place at the site of the installation, for example on a construction site.

Figure 4:
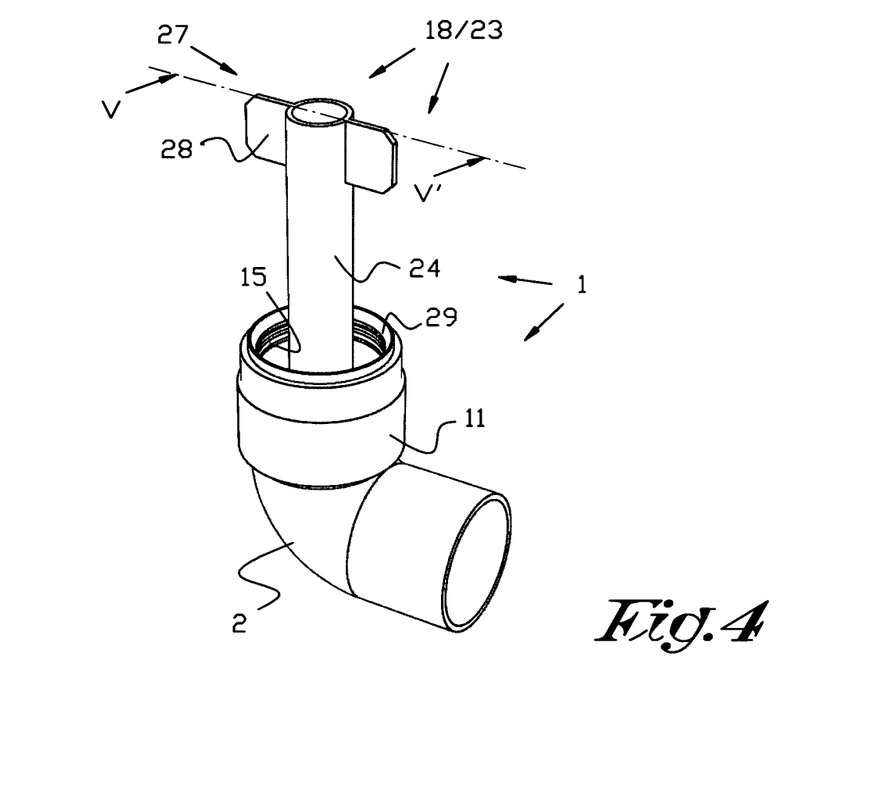
FIG. 4 shows a view in perspective of a condition as the tightening means are being tightened in the drain pipe with the aid of an auxiliary tool.
Figure 5:
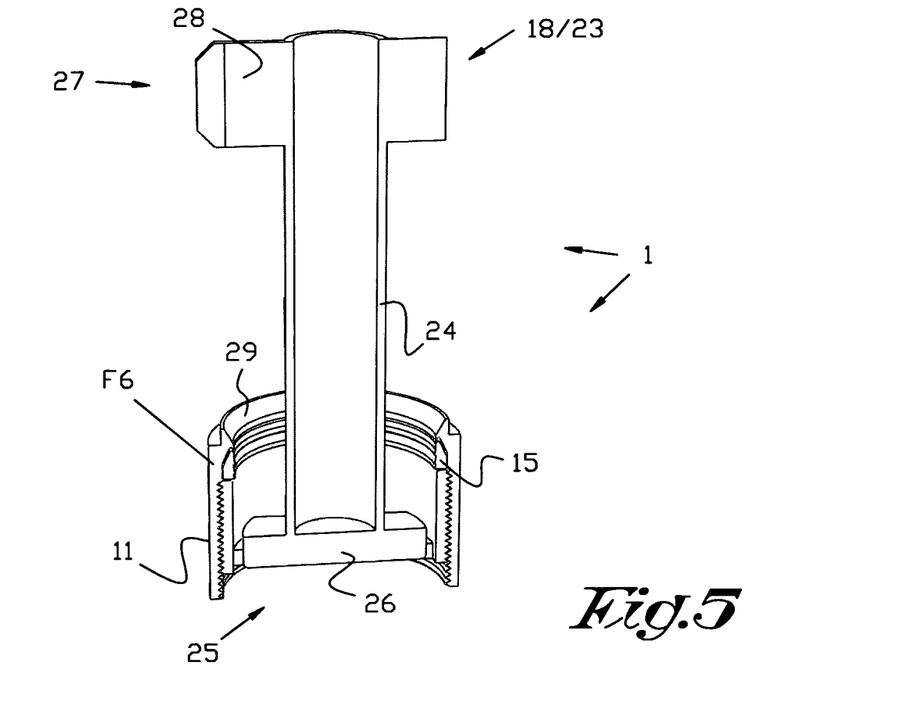
FIG. 5 shows a cross-section according to line V-V' of the connecting means shown in FIG. 4 and without the drain pipe.
Figure 10:
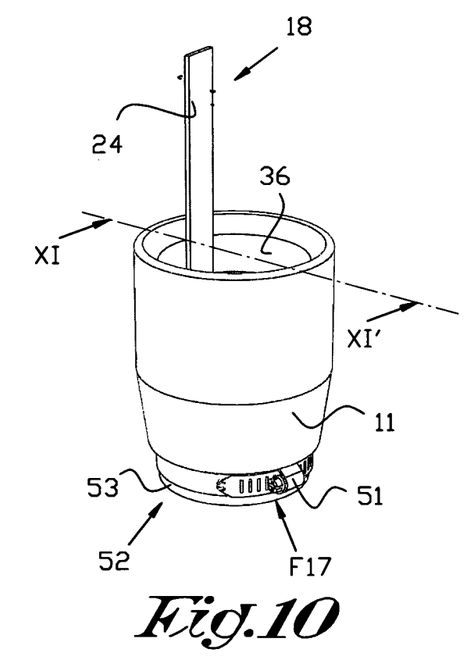
FIG. 10 shows the connecting means from FIG. 9 in perspective, this time as assembled.
Figure 11:
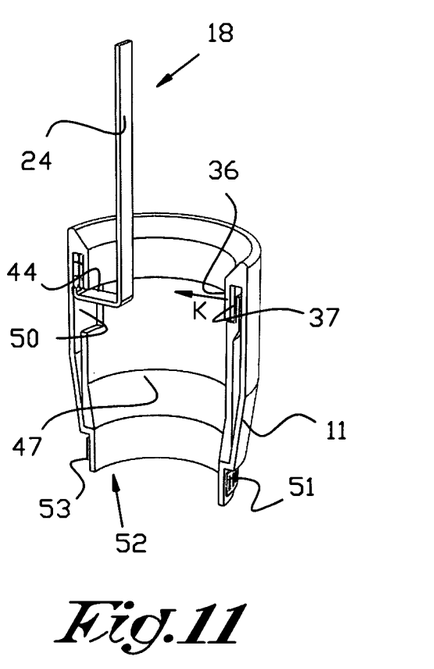
FIG. 11 shows a section according to line XI-XI'.

However, according to the invention, it is not excluded to provide users with an already assembled unit or prefab set, examples of which are shown in FIGS. 4 and 10.

The installer then only has to fit this set at the desired location and activate the tightening means 12 with the auxiliary tool 18 or 23 in order to make the connection.

The invention is by no means limited to the embodiments of connecting means 1 according to the invention for connecting a pipe 2, described by way of example and illustrated in the figures, such as for example a drain pipe 2, to a pipe section 3 at an opening 4, for example a discharge opening 4 of a sanitary installation 5; on the contrary, such connecting means 1 can be realised in many other ways while still remaining within the scope of the invention.

The invention is by no means limited to the embodiments of a method according to the invention, described by way of example and illustrated in the figures; on the contrary, such a method can be carried out in many other ways while still remaining within the scope of the invention.

The invention claimed is:

1. A drain pipe coupling system configured to sealably couple a first end of a pipe section to an existing drain pipe, the system comprising:
    a coupling piece, wherein the coupling piece is part of a screw coupling, is provided with an internal screw thread, and is configured to:
        establish a sealed fluid communication path between an interior of the pipe section and an interior of the existing drain pipe;
        be fitted over the first end of the pipe section; and
        be clamped and sealed against an outer surface of the pipe section at a sealing position remote from the first end;
    tightening means configured to tighten and seal the coupling piece against the outer surface of the pipe section at sealing position; and
    an auxiliary tool configured to act on the tightening means for tightening or loosening the tightening means;
    wherein the tightening means contains a sealing ring and a tubular, internal screw piece provided with an external screw thread configured to co-operate with the internal screw thread of the coupling piece; and
    wherein the auxiliary tool is configured to protrude through at least a portion of the pipe section, from a second end of the pipe section opposite the first end, during an act on the tightening means so the auxiliary tool is configured to be operated by an installer outside the second end of the pipe section.

2. The coupling system according to claim 1, wherein the internal screw piece is further provided with a collar extending radially inwards and which is provided with a slot; and
    wherein the auxiliary tool comprises a spanner, one end of which configured to be provided in the slot in a fitting manner in order to screw the internal screw piece in the coupling piece and to tighten the sealing ring between the coupling piece, the internal screw piece and the pipe section at the opening.

3. A drain pipe coupling system configured to sealably couple a first end of a pipe section to an existing drain pipe, the system comprising:
    a coupling piece comprising a folded edge that is directed radially inwards to form a slot with a U-shaped cross section, the coupling piece configured to:
        establish a sealed fluid communication path between an interior of the pipe section and an interior of the existing drain pipe; and
        be fitted over the first end of the pipe section;
    wherein the folded edge is configured to be clamped and sealed against an outer surface of the pipe section at a sealing position remote from the first end with the open end of the slot directed towards the first end of the pipe section;
    tightening means comprising an annular hose-spring clamp having a tensioned state with larger diameter and a relaxed state with smaller diameter, wherein the annular hose-spring clamp, in the tensioned state, is configured to be introduced into the U-shaped slot of the coupling piece, and wherein the annular hose-spring clamp in the relaxed state is configured to tighten and seal the folded edge of the coupling piece against the outer surface of the pipe section at the sealing position; and
    an auxiliary tool configured to act on the tightening means for tightening or loosening the tightening means;
    wherein the auxiliary tool is configured to protrude through the entire pipe section, from a second end of the pipe section opposite the first end, during an act on the tightening means so the auxiliary tool is configured to be operated by an installer outside the second end of the pipe section.

4. The coupling system according to claim 3, wherein the auxiliary tool comprises a hook-shaped end with which the annular hose-spring clamp is configured to be held in the tensioned state.

5. The coupling system according to claim 4, wherein the tightening means further comprises a holder comprising a tubular piece provided at one end with a protruding edge in which the annular hose-spring clamp can be retained; and
    wherein the holder is configured to be fitted in the coupling piece.

6. A drain pipe coupling system configured to sealably couple a first end of a pipe section to an existing drain pipe, the system comprising:
    a coupling piece formed by the first end of the pipe section and configured to:
        establish a sealed fluid communication path between an interior of the pipe section and an interior of the existing drain pipe;
        be fitted over the first end of the pipe section; and
        be clamped and sealed against an outer surface of the pipe section at a sealing position remote from the first end;
    tightening means configured to tighten and seal the coupling piece against the outer surface of the pipe section at sealing position; and
    an auxiliary tool configured to act on the tightening means for tightening or loosening the tightening means;
    wherein the auxiliary tool is configured to protrude through at least a portion of the pipe section, from a second end of the pipe section opposite the first end, during an act on the tightening means so the auxiliary tool is configured to be operated by an installer outside the second end of the pipe section.

7. The coupling system according to claim 6 further comprising one or more additional connection devices for connecting the pipe section to the coupling piece.

8. The coupling system according to claim 7, wherein each additional connection device is selected from the group consisting of a screw-on clamping ring and a clamping device.

9. A drain pipe coupling system configured to sealably couple a first end of a pipe section to an existing drain pipe, the system comprising:
a coupling piece configured to:
establish a sealed fluid communication path between an interior of the pipe section and an interior of the existing drain pipe;
be fitted over the first end of the pipe section; and
be clamped and sealed against an outer surface of the pipe section at a sealing position remote from the first end;
tightening means configured to tighten and seal the coupling piece against the outer surface of the pipe section at sealing position;
an auxiliary tool configured to act on the tightening means for tightening or loosening the tightening means; and
one or more additional connection devices for connecting the pipe section to the coupling piece;
wherein each additional connection device is selected from the group consisting of glue and an adhesive; and
wherein the auxiliary tool is configured to protrude through at least a portion of the pipe section, from a second end of the pipe section opposite the first end, during an act on the tightening means so the auxiliary tool is configured to be operated by an installer outside the second end of the pipe section.

10. The coupling system according to claim 9, wherein the second end of the pipe section is further provided with an external collar; and
wherein the auxiliary tool is configured to act on the tightening means by one or more of manipulating, activating and/or deactivating the tightening means.

11. A method for connecting a pipe to a first end of a pipe section comprising:
applying a coupling piece of a connecting means over a first end of the pipe section at an opening;
applying a tightening means in the coupling piece;
tightening the tightening means by manipulating and/or activating the tightening means with an auxiliary tool along a side at the opening opposite the pipe section; and
removing the auxiliary tool;
wherein applying the tightening means comprises:
applying a sealing ring over the pipe section in the coupling piece at the opening; and
applying an internal screw piece; and
wherein the tightening comprises tightening the sealing ring by means of the auxiliary tool in the form of a spanner with which the internal screw piece can be tightened.

12. A method for connecting a pipe to a first end of a pipe section comprising:
applying a coupling piece of a connecting means over a first end of the pipe section at an opening;
applying a tightening means in the coupling piece;
tightening the tightening means by manipulating and/or activating the tightening means with an auxiliary tool along a side at the opening opposite the pipe section; and
removing the auxiliary tool;
wherein applying the tightening means comprises:
applying a holder in the coupling piece in which a hose-spring clamp is held tight by means of the auxiliary tool with a hook-shaped end; and
inserting the hose-spring clamp into a folded edge with a U-shaped cross-section so as to form a slot of the coupling piece; and
wherein removing comprises removing the auxiliary tool by a downward movement, wherein an internal diameter of the hose-spring clamp decreases and a clamping of the folded edge of the coupling piece against the pipe section is obtained.

13. A method for connecting a pipe to a first end of a pipe section comprising:
applying a coupling piece of a connecting means over a first end of the pipe section at an opening;
applying a tightening means in the coupling piece;
tightening the tightening means by manipulating and/or activating the tightening means with an auxiliary tool along a side at the opening opposite the pipe section;
removing the auxiliary tool;
providing the pipe over the coupling piece; and
connecting the pipe to the coupling piece by applying a glue or by screwing on a clamping device.

14. A drain pipe coupling system comprising:
a pipe section having a first end and an opposite second end, with an external collar around the second end; and
coupling means configured to sealably couple the first end of the pipe section to an existing drain pipe, the coupling means comprising:
a coupling piece configured to establish a sealed fluid communication path between an interior of the pipe section and an interior of the existing drain pipe, wherein the coupling piece is configured to be fitted over the first end of the pipe section and is configured to be clamped and sealed against an outer surface of the pipe section at a sealing position remote from the first end;
tightening means configured to tighten and seal the coupling piece against the outer surface of the pipe section at the sealing position; and
an auxiliary tool configured to act on the tightening means for tightening or loosening the tightening means;
wherein the auxiliary tool is configured to protrude through at least a portion of the pipe section, from a side of the collar opposite the pipe section, during an act on the tightening means so the auxiliary tool is configured to be operated by an installer at the side of the collar opposite the pipe section.

15. A drain pipe coupling system comprising:
a pipe section having a first end and an opposite second end, with an external collar around the second end; and
coupling means configured to sealably couple the first end of the pipe section to an existing drain pipe, the coupling means comprising:
a coupling piece configured to establish a sealed fluid communication path between an interior of the pipe section and an interior of the existing drain pipe, wherein the coupling piece is configured to be fitted over the first end of the pipe section, wherein the coupling piece comprises a folded edge that is directed radially inwards to form a slot with a U-shaped cross section, and wherein the folded edge is configured to be clamped and sealed against an outer surface of the pipe section at a sealing position remote from the first end with the open end of the slot directed towards the first end of the pipe section;

tightening means comprising an annular hose-spring clamp having a tensioned state with larger diameter and a relaxed state with smaller diameter, wherein the annular hose-spring clamp in the tensioned state is configured to be introduced into the U-shaped slot of the coupling piece, and wherein the annular hose-spring clamp in the relaxed state is configured to tighten and seal the folded edge of the coupling piece against the outer surface of the pipe section at the sealing position; and an auxiliary tool configured to act on the tightening means for tightening or loosening the tightening means;

wherein the auxiliary tool is configured to protrude through the entire pipe section, from a side of the collar opposite the pipe section, during an act on the tightening means so the auxiliary tool is configured to be operated by an installer at the side of the collar opposite the pipe section.

16. A cylindrical coupling piece for a drain pipe coupling system configured to sealably couple a first end of a pipe section to an existing drain pipe, wherein the coupling piece has a first axial end and a second axial end axially opposite the first axial end, the coupling piece comprising:

a folded edge at the first axial end that is directed radially inward to form a slot with a U-shaped cross section;

wherein an open end of the slot is directed towards the second axial end; and wherein the U-shaped slot is configured to accommodate an annular hose-spring clamp in a tensioned state.

* * * * *